(12) United States Patent
Nielson et al.

(10) Patent No.: US 8,287,191 B2
(45) Date of Patent: Oct. 16, 2012

(54) LOCKING OPTICAL AND/OR ELECTRICAL CONNECTORS AND CABLE ASSEMBLIES

(75) Inventors: Jeffrey D. Nielson, Wylie, TX (US); Bradley S. Billman, Denton, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 330 days.

(21) Appl. No.: 12/784,830

(22) Filed: May 21, 2010

(65) Prior Publication Data

US 2011/0286702 A1 Nov. 24, 2011

(51) Int. Cl.
G02B 6/36 (2006.01)
(52) U.S. Cl. ............... 385/76; 385/75; 385/69; 439/304; 439/345
(58) Field of Classification Search ............. 385/53–56, 385/69–71, 75–76; 439/304, 345
See application file for complete search history.

(56) References Cited

U.S. PATENT DOCUMENTS

| | | |
|---|---|---|
| 4,647,726 A | 3/1987 | Blum |
| 5,090,916 A | 2/1992 | Magnier |
| 5,330,369 A | 7/1994 | Nozaki et al. |
| 5,538,438 A | 7/1996 | Orlando |
| 5,556,295 A | 9/1996 | McFadden et al. |
| 5,579,425 A | 11/1996 | Lampert et al. |
| 6,024,498 A * | 2/2000 | Carlisle et al. .................. 385/56 |
| 6,080,001 A | 6/2000 | Wong |
| 6,672,898 B2 | 1/2004 | Kahle et al. |
| 6,821,024 B2 | 11/2004 | Bates, III |
| 6,863,556 B2 | 3/2005 | Viklund et al. |
| 6,918,782 B2 | 7/2005 | Foster |
| 7,052,186 B1 | 5/2006 | Bates |
| 7,163,414 B2 | 1/2007 | Lo et al. |
| 7,182,621 B2 | 2/2007 | Reichle |
| 7,204,721 B2 | 4/2007 | Lundholm et al. |
| 7,354,291 B2 | 4/2008 | Caveney et al. |
| 7,438,584 B2 | 10/2008 | Caveney et al. |
| 7,632,125 B2 | 12/2009 | Irwin et al. |
| 7,695,198 B1 * | 4/2010 | Baechtle et al. ............... 385/69 |
| 8,152,385 B2 * | 4/2012 | de Jong et al. ................. 385/71 |
| 2002/0076164 A1 | 6/2002 | Childers et al. |
| 2003/0063862 A1 | 4/2003 | Fillion et al. |
| 2004/0047565 A1 | 3/2004 | Cheng et al. |
| 2009/0004904 A1 | 1/2009 | Caveney et al. |
| 2009/0007609 A1 | 1/2009 | Obenshain |
| 2010/0136809 A1 | 6/2010 | Andres et al. |

FOREIGN PATENT DOCUMENTS

EP 1 913 660 2/2007
WO WO 2006/052420 A1 5/2006

* cited by examiner

*Primary Examiner* — Ellen Kim
(74) *Attorney, Agent, or Firm* — Muncy, Geissler, Olds & Lowe, PLLC

(57) ABSTRACT

A blocking member is sized and shaped to be installed beneath a trigger or triggers of a duplex connector. The blocking member prevents depression of the trigger(s) of the duplex connector and hence prevents depression of latches to release the plugs of the duplex connector from mated receptacles. The blocking member does not block actuation of the latches of the duplex connector. Through the use of a tool, the trigger(s) may be bypassed and the latches operated directly by the tool to release the plugs of the duplex connector when mated to receptacles.

20 Claims, 14 Drawing Sheets

LOCKING OPTICAL AND/OR ELECTRICAL CONNECTORS AND CABLE ASSEMBLIES

BACKGROUND OF THE INVENTION

1. Field of the Invention

The present invention relates to duplex connectors. More particularly, the present invention relates to a locking device to resist unlatching of tandem plugs when mated within receptacles and relates to a tool to unlatch the tandem plugs from the mated receptacles.

2. Description of the Related Art

FIG. 1 illustrates a duplex fiber optic connector 11 in accordance with the prior art. Generally, the duplex connector 11 includes a first plug 13 and a second plug 15, which are identically structured and which are joined together by a clip body 17. The clip body 17 may be structured to hold the first and second plugs 13 and 15 in a removable fashion, e.g., by a snap fit, or in a more permanent fashion, e.g., by an adhesive.

The first plug 13 includes a flexible first latch 19. The first latch 19 includes left and right ears 21. The second plug 15 includes a flexible second latch 23 with left and right ears 25. A flexible trigger 27 is attached to the clip body 17 at a living hinge portion 29. The trigger 27 may be depressed to apply simultaneous downward pressure onto the first and second latches 19 and 23.

FIG. 2 illustrates the duplex fiber optic connector 11 mated to an adapter 31. When attaching the first and second plugs 13 and 15 into mating receptacles within the adapter 31, the first and second latches 19 and 23 bend downwardly. As the first and second plugs 13 and 15 enter onto the receptacles, the ears 21 and 25 snap upwardly as the ears 21 and 25 pass by internal ledges within the receptacles. The engagements between the ears 21 and 25 and the internal ledges within the receptacles act to retain the first and second plugs 13 and 15 within the receptacles, respectively.

To disconnect the first and second plugs 13 and 15, the user depresses the trigger 27, which applies a downward pressure on the first and second latches 19 and 23. When the latches 19 and 23 are depressed, the ears 21 and 25 move downward away from the internal ledges within the receptacles, such that the first and second plugs 13 and 15 may be removed from the receptacles. More detail concerning duplex connectors can be found in the prior art, such as U.S. Pat. Nos. 5,579,425; 6,672,898 and 7,632,125, which are herein incorporated by reference.

U.S. Pat. No. 7,632,125, as exemplified in FIG. 3 herein, appreciated a problem with duplex fiber optic connectors. With duplex fiber optic connectors, the plugs are susceptible to accidental latch depression and unauthorized tampering. To prevent disconnection of the duplex connectors from mated receptacles, U.S. Pat. No. 7,632,125 provides a hood 10 to cover the latches of the plugs. The hood 10 includes openings 42 to accept prongs 132 of a tool 130 and a middle opening 44 to accept a center tab 134 of the tool 130. The prongs 132 are able to depress the latches. Then, the tool 130 can remove the duplex connector by virtue of a snap attachment between the center tab 134 and a lip of the middle hole 44 of the hood 10.

SUMMARY OF THE INVENTION

The Applicants have appreciated drawbacks with the structures of the background art.

The structure of the hood 10 in U.S. Pat. No. 7,632,125 adds height/thickness to the duplex connector. Often, receptacles for duplex connectors are placed in confined or restricted places, e.g. closely adjacent to a protruding edge of a housing in the case of receptacles formed as ports on a piece of equipment's back wall; or just beneath the receptacles of another duplex connector in the case of a high density patch panel. The hood 10, as it protrudes above the duplex connector, can interfere with an adjacent structure, e.g., abut another feature on the back wall of the equipment and prevent mating of the duplex connector into the receptacles, or partially cover adjacent upper receptacles in the case of a high density patch panel, hence preventing use of the upper adjacent receptacles.

The hood 10 of U.S. Pat. No. 7,632,125 is intended to completely block access to the latches more as a security feature to prevent tampering, and hence by natural consequence accidental disconnection of the duplex connector. The Applicants have appreciated that a less robust and simpler device may be desired to primarily prevent accidental disconnection. Accidental disconnection can be particularly troublesome where the duplex connector is establishing essential services, which even if momentarily disconnected could lead to costly financial losses, false alarms or emergency situations, such as when an Internet connection is momentarily disconnected and Internet business transactions are interrupted or lost. Technicians often make mistakes in locating the proper duplex connector to disconnect. Frequently, a schematic attached to a door or wall in the network closet must be compared to actual duplex connectors on multiple patch panels. The technician may make an error in physically locating the proper patch panel and/or duplex connector corresponding to the duplex connector identified in the schematic and accidentally disconnect the wrong duplex connector.

The Applicants have also appreciated a keying system, wherein a first set of duplex connectors can be blocked from manual unlatching and be unlatched using a first tool, while a second set of duplex connectors can be blocked from manual unlatching and be unlatched using a second tool, where the second tool will not unlatch the duplex connectors of the first set and the first tool will not unlatch the duplex connectors of the second set.

It is an object of the present invention to address one or more of the drawbacks of the prior art and/or Applicants' appreciated needs in the art.

It is an object of the present invention to reduce the likelihood of accidental and intentional decoupling of communications cables resulting in a more reliable and secure network.

The Applicants have appreciated a need in the art for a relatively simple blocking member to be installed beneath a trigger or triggers of a fiber optic or copper duplex connector. The blocking member does not block actuation of the latches of the duplex connector. Rather, the blocking member prevents depression of the trigger(s) of the duplex connector, which normally is/are used to actuate the latches and release the duplex connector from receptacles. In a preferred embodiment, the blocking member does not add to the overall height/thickness of the duplex connector. Through the use of a simple tool the trigger(s) may be bypassed and the latches operated directly by the tool to release the duplex connector when mated to receptacles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
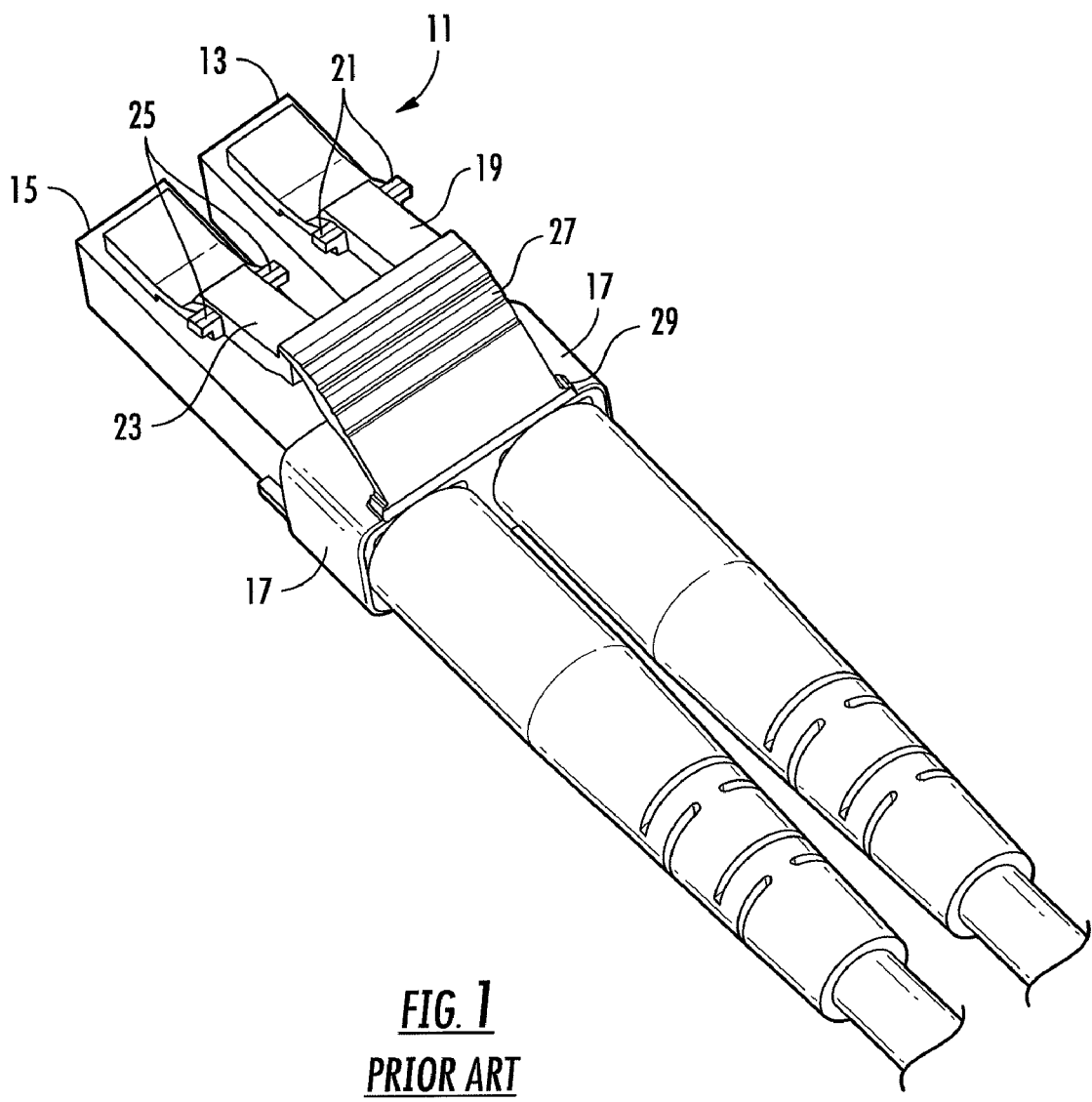
FIG. 1 is a perspective view of a duplex fiber optic connector, in accordance with the prior art.
Figure 2:
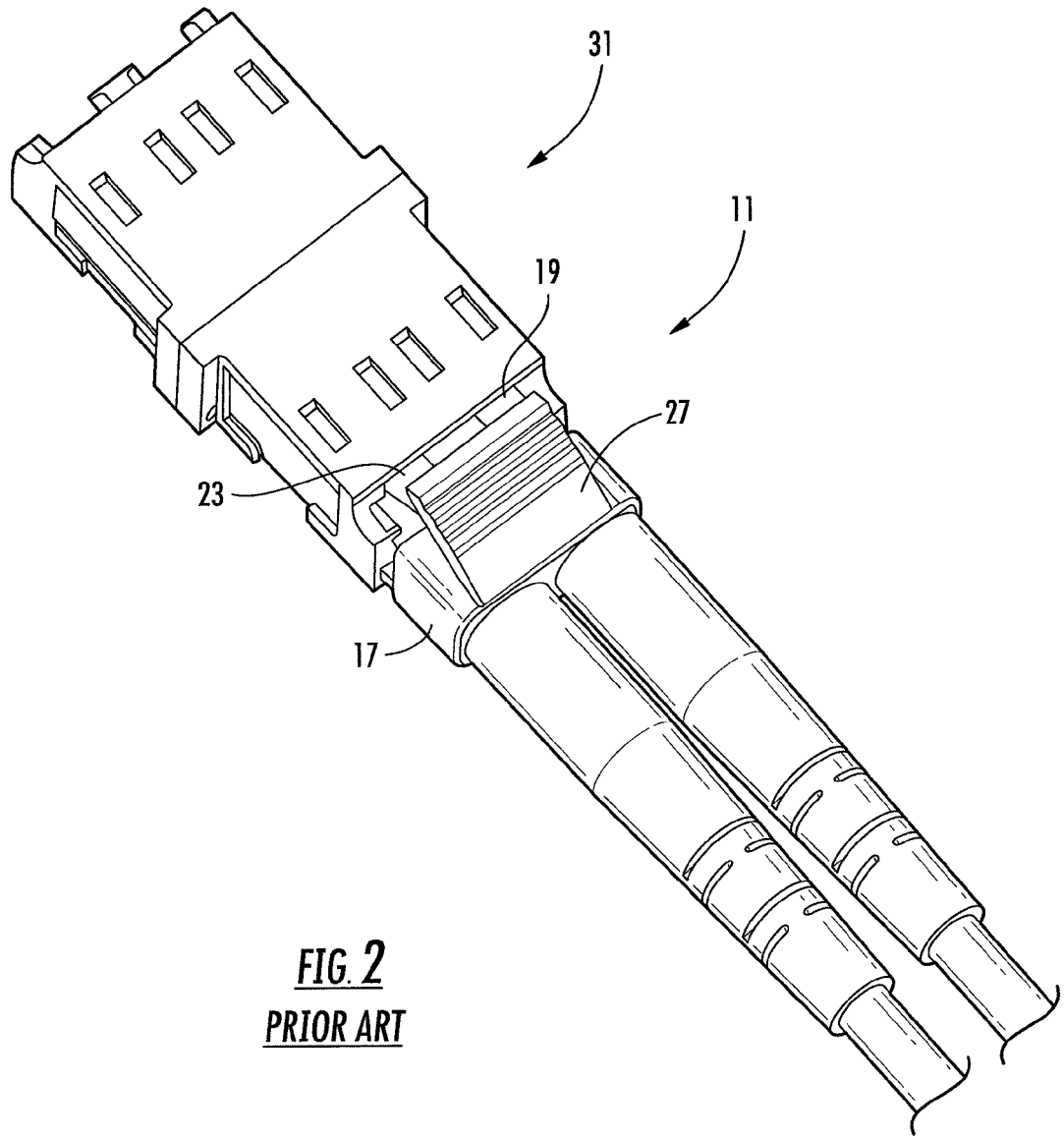
FIG. 2 is a perspective view of the duplex connector of FIG. 1 attached to receptacles of an adapter, in accordance with the prior art.
Figure 3:
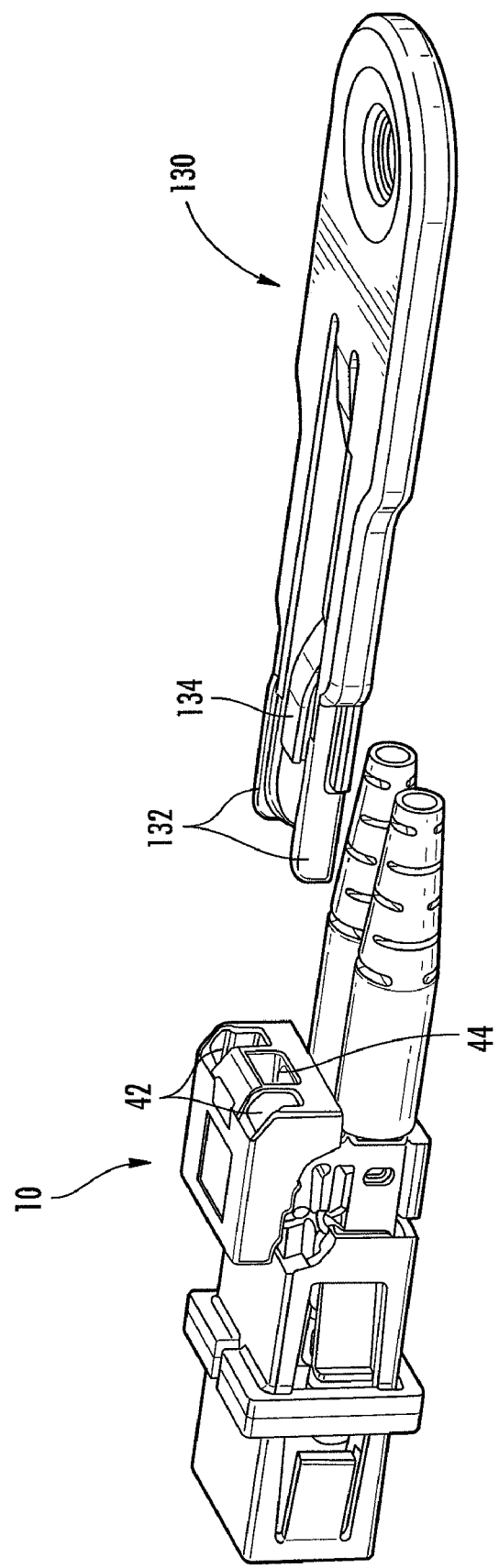
FIG. 3 is a perspective view of a blocking hood to prevent unauthorized removal of the duplex connector from the adapter and a tool to remove the blocking hood, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 4:
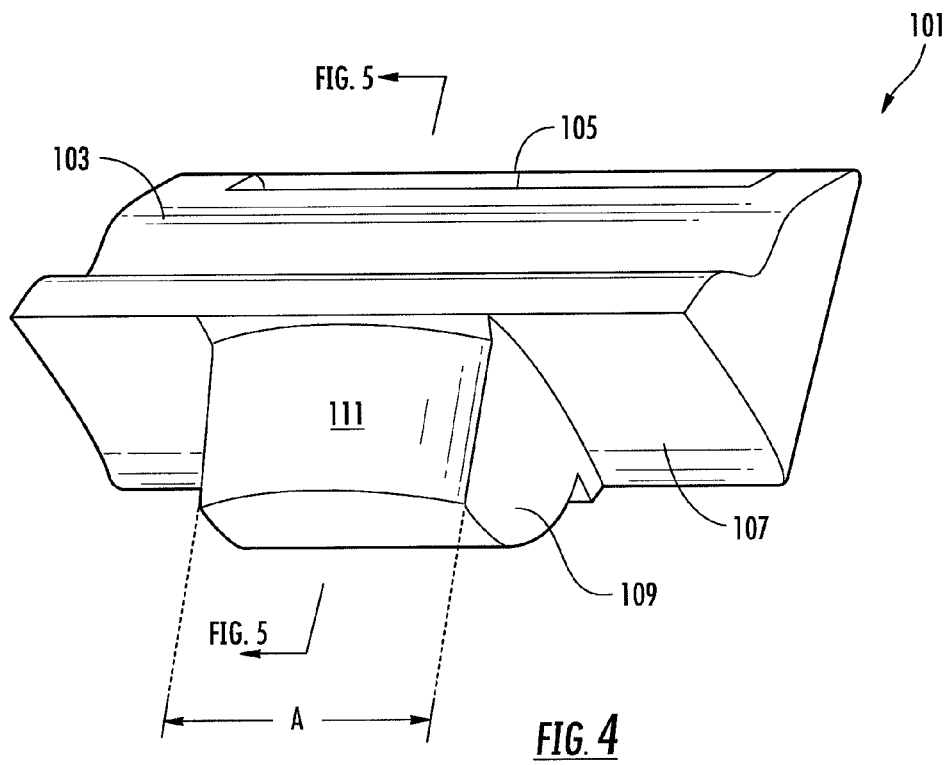
FIG. 4 is a front perspective view of a blocking member, in accordance with one embodiment of the present invention.

FIG. 4 is a front perspective view of a blocking member 101, in accordance with one embodiment of the present invention. In a preferred embodiment, the blocking member 101 is formed as a solid mass of plastic. Other materials could be used to form the blocking member 101, such as ceramic, wood, or even a metal or an alloy. Further, the blocking member 101 could have a hollow interior, so long as the material used to form the blocking member 101 had sufficient strength to maintain its shape under manually applied pressure, e.g., crush resistance.

A front side of the blocking member 101 is generally characterized by a ramp surface 103. The "front" of the blocking member 101 is being defined as the surface typically facing a user during use. The ramp surface 103 may optionally include a notched feature 105, which may cooperate with complimentary features on a duplex connector to assist in retaining the blocking member 101 in attachment to the duplex connector and/or serve as a labeling surface.

A rear side 107 of the blocking member 101 includes a nose 109. In one embodiment, the nose 109 has a solid upper surface 111. The "upper" surface of the blocking member 101 is being defined as the surface, which faces upwardly relative to a user when the duplex connector is inserted into an adapter accepting latches facing upward, as will be described in more detail hereinafter. A nose width A of the nose 109 is about 0.16 inches or less, preferably about 0.146. An overall width of the blocking member 101 is about 0.37 inches or less, preferably about 0.34 inches.

Figure 5:
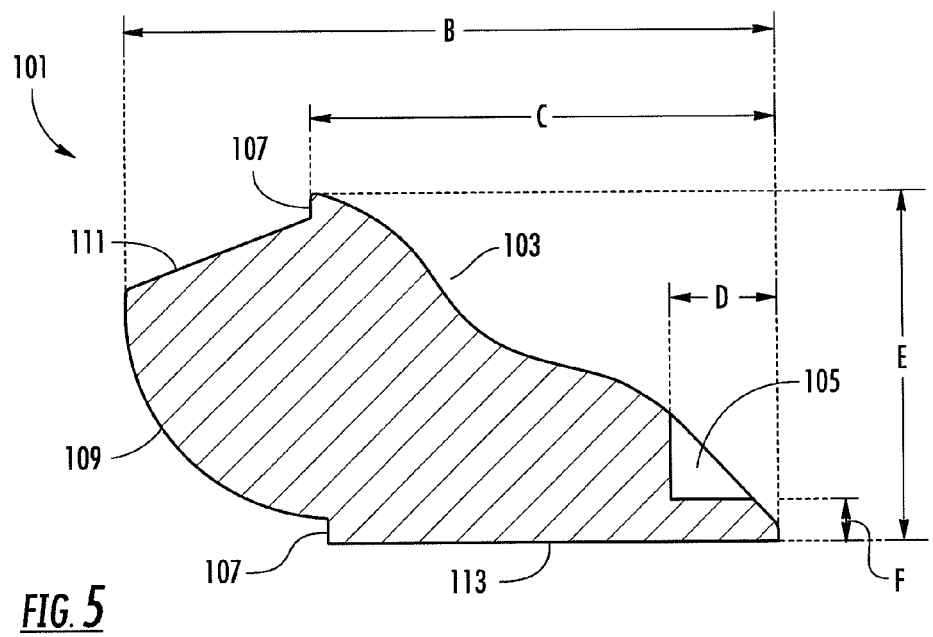
FIG. 5 is a cross sectional view taken along line V-V in FIG. 5.

FIG. 5 is a cross sectional view taken along line V-V in FIG. 4. As best seen in FIG. 5, the overall length B of the blocking member 101 is about 0.29 inches or less, preferably about 0.27 inches. A front length C from the front edge of the ramp surface 103 to the rear side 107 is about 0.21 inches or less, preferably about 0.192 inches. A notch length D of the notch feature 105 is about 0.05 inches or less, preferably about 0.045 inches. An overall height E of the blocking member 101 is about 0.18 inches or less, preferably about 0.161 to about 0.154 inches. A notch start height F between a bottom 113 of the blocking member 101 and a floor of the notch feature 105 is about 0.025 inches or less, preferably about 0.023 inches.

Figure 6:
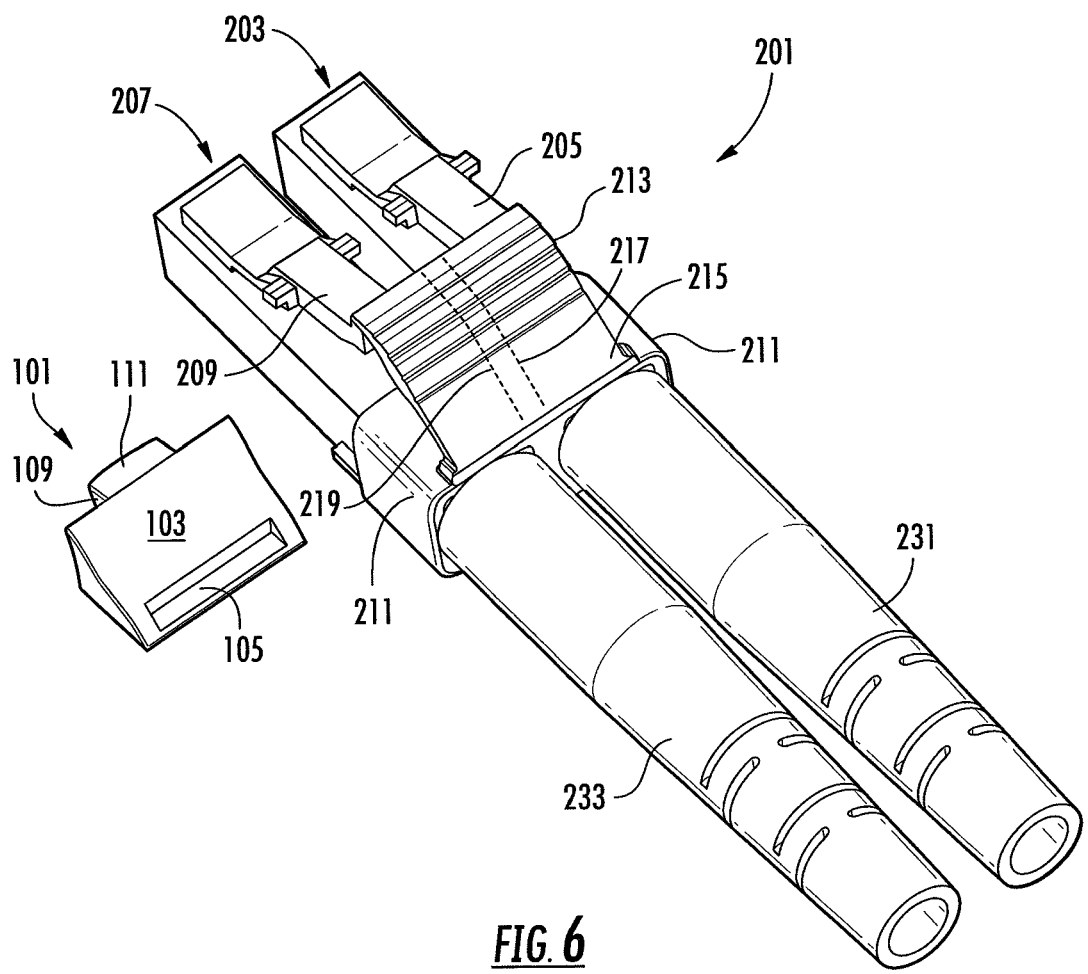
FIG. 6 is a back perspective view of the blocking member of FIG. 4 aligned for insertion beneath the trigger of a duplex connector.
Figure 7:
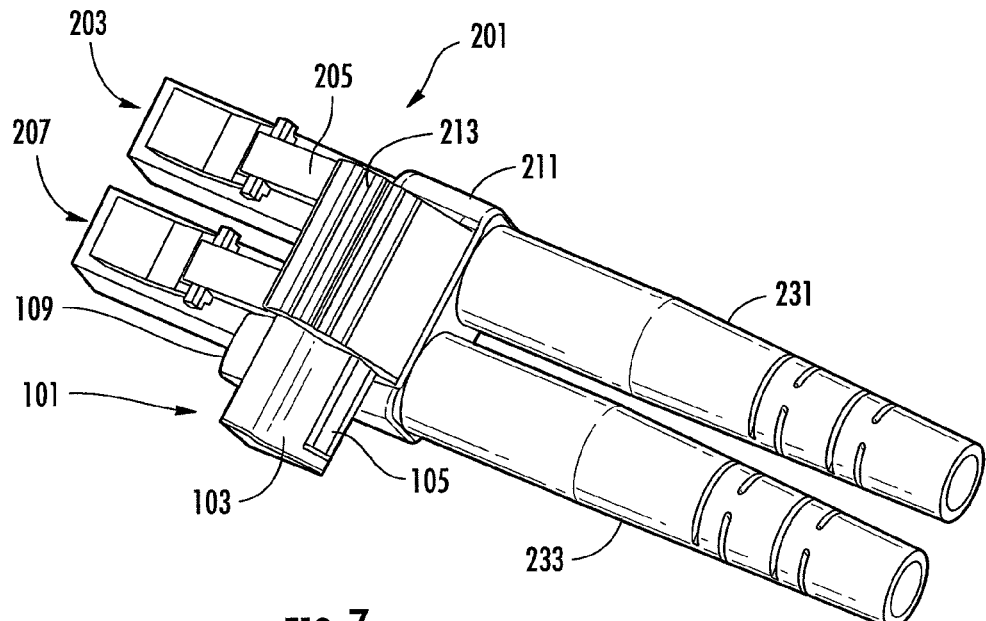
FIG. 7 is a back perspective of the blocking member being partially inserted beneath the trigger of the duplex connector.
Figure 8:
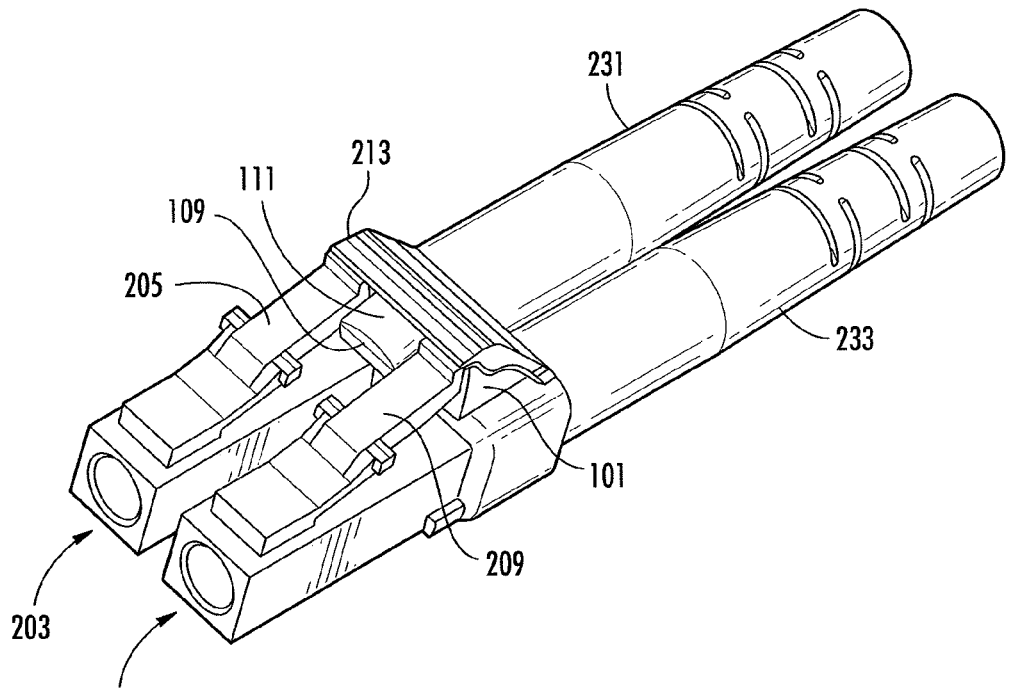
FIG. 8 is a front perspective view of the blocking member fully inserted beneath the trigger of the duplex connector.

With reference to FIGS. 6, 7 and 8, the interaction between the blocking member 101 and a duplex fiber optic connector 201 will be described. The duplex fiber optic connector 201 has a first fiber optic plug 203 with a first depressible latch 205. The first plug 203 is connected to a first fiber optic cable via a first strain relief boot 231. The duplex connector 201 also has a second fiber optic plug 207 with a second depressible latch 209. The second plug 207 is connected to a second fiber optic cable via a second strain relief boot 233. An attachment feature 211 connects the first plug 203 and the second plug 207. At least one trigger 213 is connected to the attachment feature 211. The trigger 213 is connected to the attachment feature 211 by a living hinge 215. The trigger 213 may be depressed to apply simultaneous downward pressure onto the first and second latches 205 and 209.

The construction of the duplex connector 201 is in accordance with the prior art, as incorporated previously. The duplex connector 201 may be constructed in many different manners in accordance with the prior art, such as by employing a different type of attachment feature 211. The first and second plugs 203 and 207 may be LC simplex, LC duplex, LC multi-fiber or other types of fiber optic connectors. Further, the first and second plugs 203 and 207 could have electrical contacts (e.g., RJ-type plugs, RJ-47 plugs, RJ-11 plugs), whereby the trigger 213 depresses the latches of the RJ-type plugs. Further, the first and second plugs 203 and 207 could have both electrical contacts and optical fibers. Also, the duplex connector 201 may employ two triggers, one trigger for the first latch 205 and another trigger for the second latch 209, such a configuration would result by removing the single trigger's material between the dashed lines 217 and 219 in FIG. 6.

To insert the blocking member 101, the blocking member is first aligned to the side of the trigger 213, as illustrated in FIG. 6. Next, the blocking member 101 is pushed under the trigger 213, as illustrated in FIG. 7, until the blocking member is fully seated under the trigger 213, as illustrated in FIG. 8.

In one embodiment, as best seen in FIG. 8, when the blocking member 101 is fully seated, the nose 109 is captured within an area between the first and second latches 205 and 209. To facilitate this, the solid upper surface 111 has a radius (as best seen in FIG. 4). A user slightly pulls the second latch 209 upwardly against its natural resiliency to allow the upper surface 111 of the nose 109 to slip slightly under the second latch 209. As the nose 109 is pressed underneath the trigger 213, the second latch 209 rides on the upper surface 111 of the nose 109. When the blocking member 101 is fully inserted, the nose 109 passes the underside edge of the second latch 209 and allows the second latch 209 to snap downwardly under its own natural resiliency. The nose 109 is then snap-captured in the area between the first and second latches 205 and 209. Additionally or alternatively, the notch feature 105 may snap engage with a portion of the trigger 213 or attachment feature 211.

In these preferred embodiments, the blocking member 101 will be secured to the duplex fiber optic connector 201, and would be removable only upon manually manipulation, e.g., pulling upwardly on the first and/or second latches 205 and 209 to free the nose 109 and pressing laterally on the blocking member 101 to press the blocking member 101 out from under the trigger 213. Such steps to remove the blocking member 101 could only be performed while the duplex connector 201 is unmated.

Figure 9:
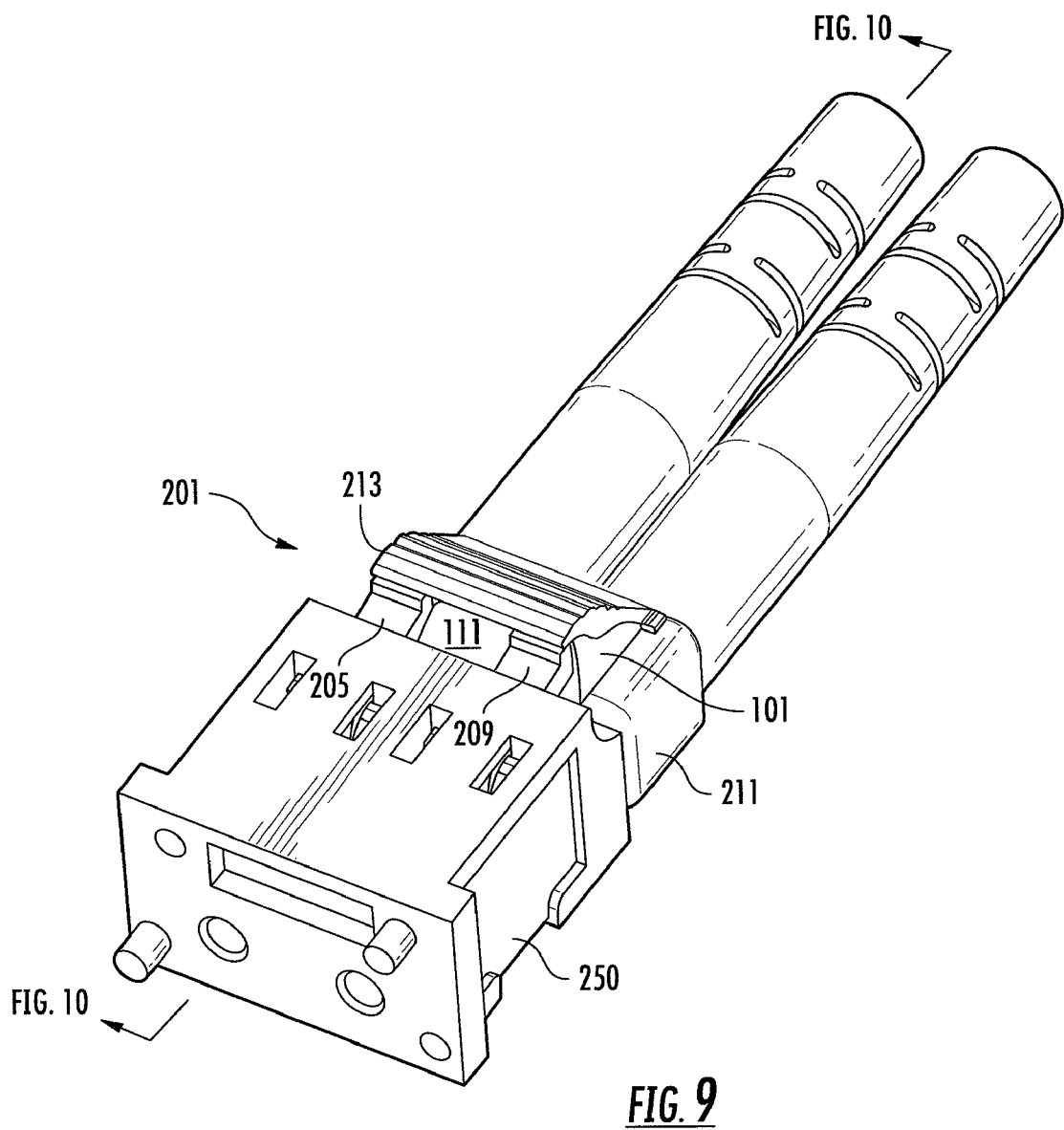
FIG. 9 is a front perspective view of the duplex connector of FIG. 8 mated with receptacles of an adapter half.

FIG. 9 is a perspective view similar to FIG. 8, but illustrating the duplex connector 201 mated within two receptacles of a first adapter half 250. Again, reference can be made to the existing arts for a description of the adapter half 205, which basically captures the ears of the first and second latches 205 and 209 and holds the first and second plugs 203 and 207 until the first and second latches 205 and 209 are depressed to release the first and second plugs 203 and 207 from the first adapter half 250.

Figure 10:
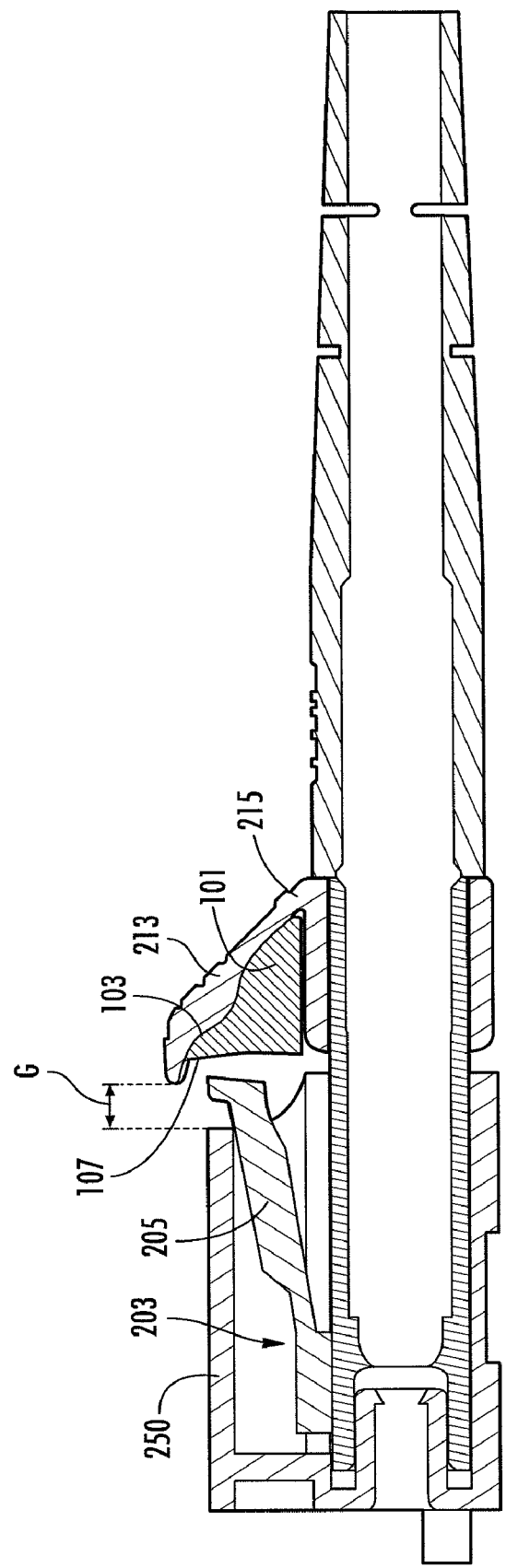
FIG. 10 is a cross sectional view taken along line X-X in FIG. 9.

FIG. 10 is a cross sectional view taken along line X-X in FIG. 9, where the internal fiber, ferrule and ferrule holding structures have been removed to simplify the drawing. FIG. 10 illustrates the function of the installed blocking member 101. With the blocking member 101 under the trigger 213, a user is unable to depress the trigger 213. Hence, the first and second latches 205 and 209 cannot be depressed by the trigger 213, and the first and second plugs 203 and 207 remain mated to the first adapter half 250.

As illustrated in FIG. 10, there is a narrow gap G, having a width of about 0.05 inches or less, where the first and second latches 205 and 209 are visible/accessible to the user. However, the user's fingers are not able to fit into the narrow gap G. Therefore, the user cannot manually unlatch the first and second plugs 203 and 207 from the first adapter half 250 using fingers alone and a tool, to be described hereinafter, will be required.

This arrangement demonstrates a principal feature of the present invention. Basically, the encountering of the blocked trigger or triggers on a duplex connector 201 is a sign or indication to the user that the duplex connector 201 is of an elevated relative importance (e.g., an Internet link wherein business/stock transactions occur). The blocked trigger indicates that the duplex connector 201 requires a tool and is not like the typical duplex connectors encountered by the user, which can be easily and quickly disconnected using only finger pressure. Encountering such a blocked duplex connector 201 may prevent an accidental disconnection. For example, the technician may have been attempting to locate a typical, unblocked duplex connector and would therefore be prevented from accidentally disconnecting a vital connection. Encountering the blocked trigger would prompt the technician to return to the schematic of the networking closet and recheck the location for the correct duplex connector.

Figure 11:
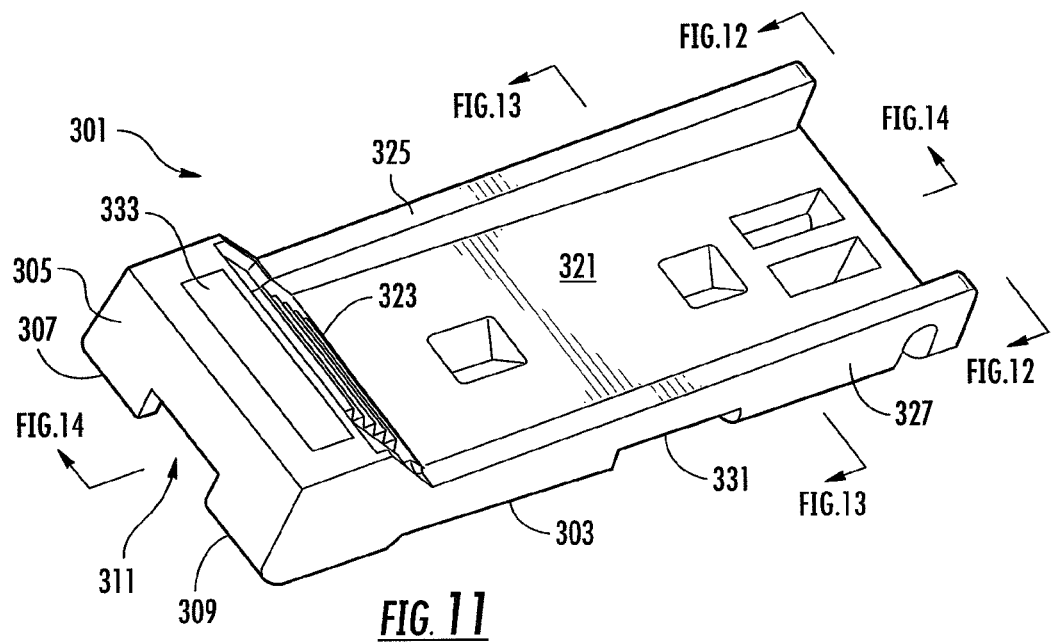
FIG. 11 is a front perspective view of an unlatching tool, in accordance with one embodiment of the present invention.
Figure 12:
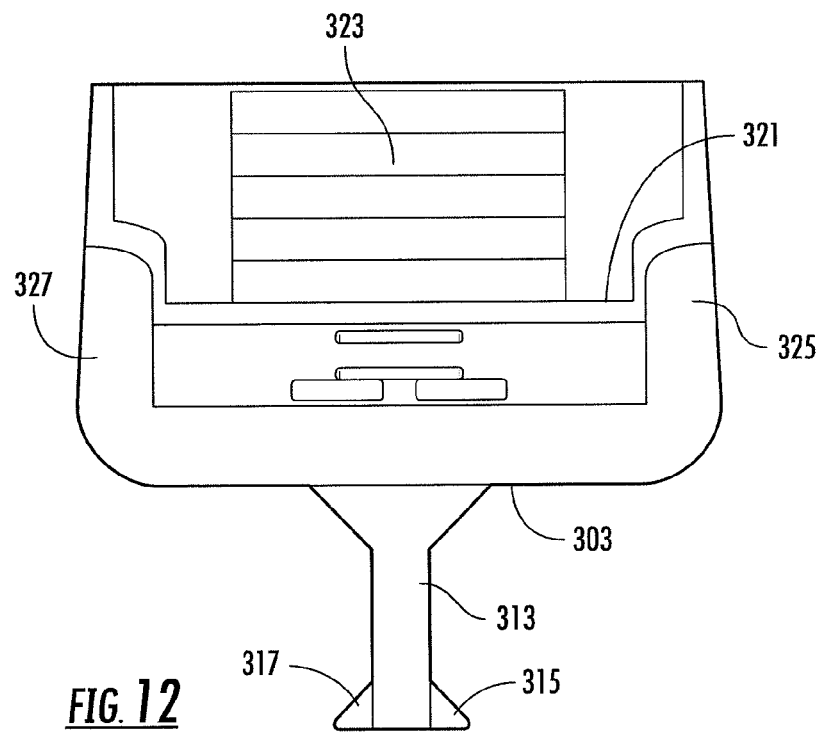
FIG. 12 is a back end view of the tool from the perspective of line XII-XII in FIG. 11.
Figure 13:
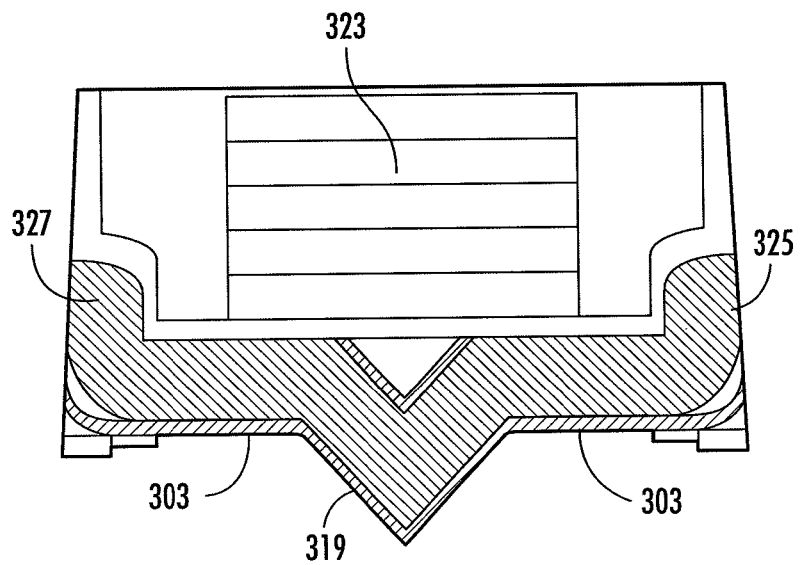
FIG. 13 is a cross sectional view taken along line XIII-XIII in FIG. 11.
Figure 14:
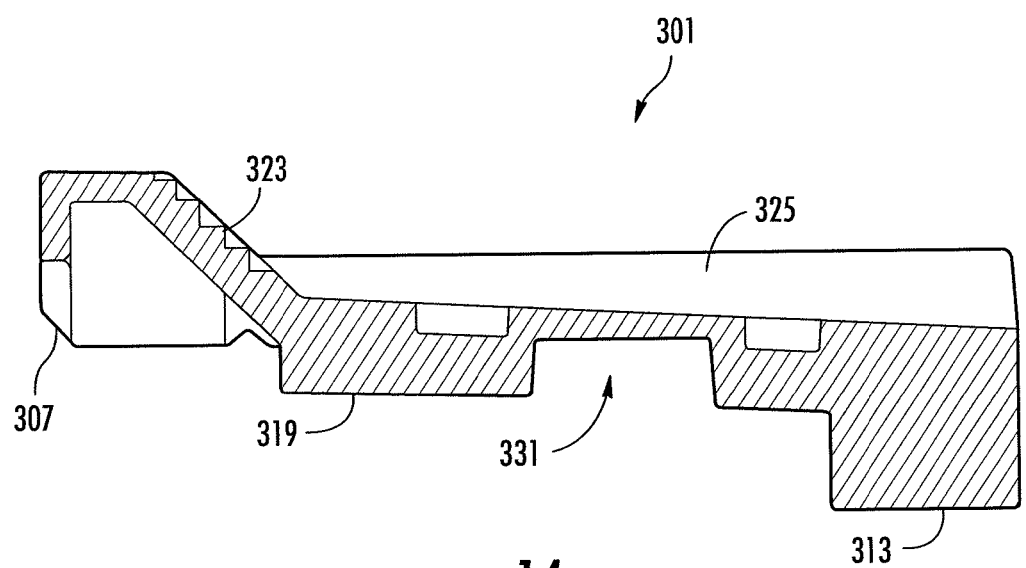
FIG. 14 is a cross sectional view taken along line XIV-XIV in FIG. 11.

Now with reference to FIGS. 11-14, one embodiment of an unlatching tool 301 to disconnect a duplex connector 201 with a blocked trigger 213 from mated receptacles will be described. FIG. 11 is a front perspective view of the tool 301. FIG. 12 is a back end view of the tool 301 from the perspective of line XII-XII in FIG. 11. FIG. 13 is a cross sectional view taken along line XIII-XIII in FIG. 11. FIG. 14 is a cross sectional view taken along line XIV-XIV in FIG. 11.

In one embodiment, the tool 301 includes an engagement surface 303 to rest on top of a duplex connector 201 and a forward face 305. The forward face 305 is sized to pass over the at least one trigger 213 of the duplex connector 201 and engage upper surfaces of the first and second latches 205 and 209 of the duplex connector 201 to depress the first and second latches 205 and 209. More specifically, the forward face 305 of the tool 301 includes a first edge 307 to depress the first latch 205, a second edge 309 to depress the second latch 209 and a void area 311 located between the first and second edges 307 and 309. The void area 311 receives the nose 109 of the blocking member 101 when the first and second edges 307 and 309 move to depress the first and second latches 205 and 209, as will be described hereinafter.

In one embodiment, the engagement surface 303 includes a long projection 313 extending downwardly beneath it (see FIGS. 12, 14, 15 and 16). The long projection 313 is sized to pass entirely between the strain relief boots 231 and 233 of the first and second plugs 203 and 207 of the duplex connector 201. Optionally, the long projection 313 may include lateral wings 315 and 317 at its distal end to abut the undersides of the strain relief boots 231 and 233, respectively. Optionally, two long projections similar to long projection 313 may extend downward from right and left sidewalls 325 and 327 to engage outer surfaces of strain relief boots 231 and 233 or a single boot on an LC uniboot connector.

Figure 17:
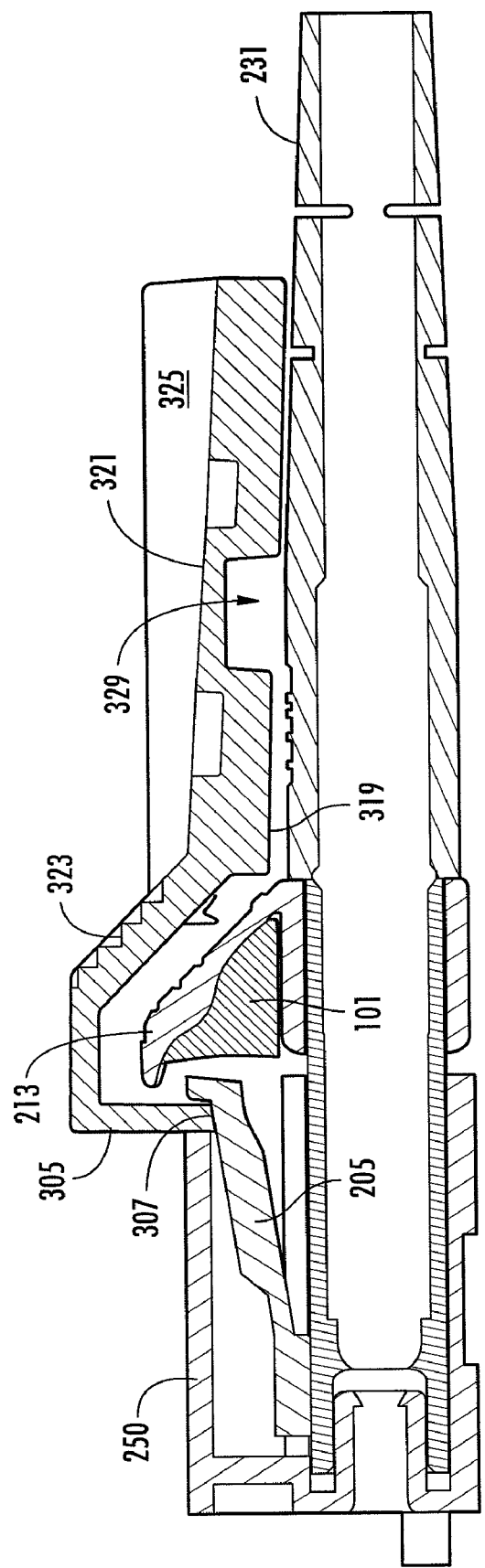
FIG. 17 is a cross sectional view taken along line XVII-XVII in FIG. 16.

The engagement surface 303 may additionally or alternatively include a short projection 319, such as the v-shaped projection as illustrated in FIGS. 13, 14 and 17. The short projection 319 serves as an alignment feature to center the tool 301 on the top of the duplex connector 201. The short projection 319 partially protrudes into the space between the first and second strain relief boots 231 and 233.

Figure 15:
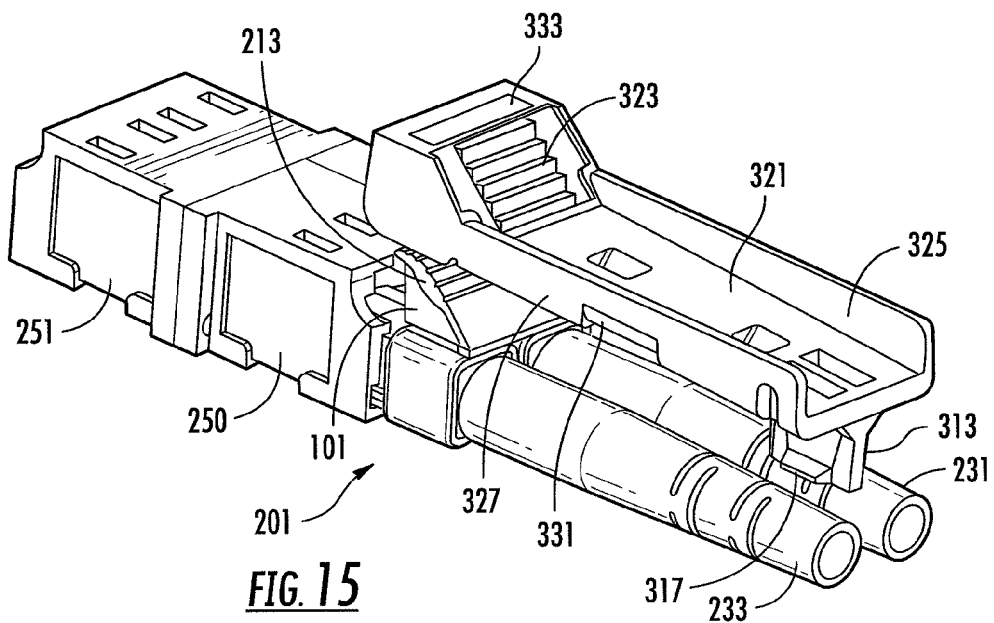
FIG. 15 is a back perspective view illustrating the tool of FIG. 11 aligned above the duplex connector latched into an adapter.

The opposite side of the engagement surface 303 is referred to as the finger surface 321. In use, a technician's finger would lie against the finger surface 321 and the technician's finger tip would contact the ridges 323 at the forward end of the finger surface 321. Right and left side walls 325 and 327 flank the finger and engagement surfaces 321 and 303. The right and left sidewalls 325 and 327 include right and left notches 329 and 331, respectively. The right and left notches 329 and 331 are provided to receive a loop of material to secure the tool 301 to a user's finger. For example, an elastic band or a strap with a hook and loop fastener would encircle the technician's finger and the tool 301 as it passed around the right and left notches 329 and 331. The tool 301 may optional include a labeling surface 333, as best seen in FIGS. 11, 15 and 16.

Now with reference to FIGS. 15, 16 and 17, the unlatching operation will be described. As shown in FIG. 15, the tool 301 is oriented above the duplex connector 201 mated into the first adapter half 250. FIGS. 15 and 16 also show a second adapter half 251 attached to the first adapter half 250.

Figure 16:
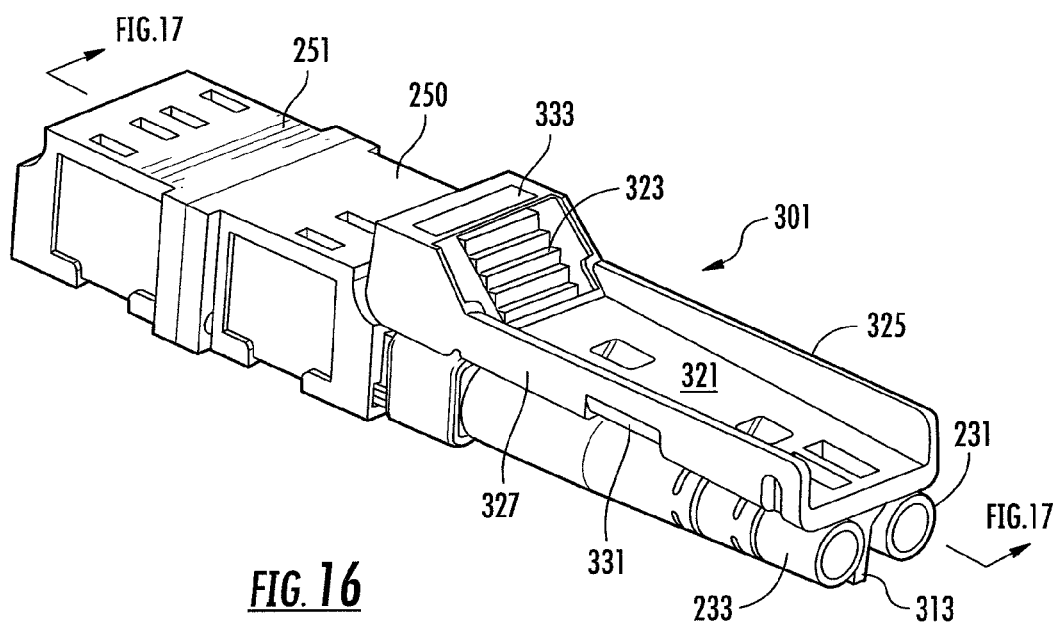
FIG. 16 is a back perspective view similar to FIG. 15, but illustrating the tool pressed down onto the duplex connector to unlatch the duplex connector from the adapter.

Next, in FIG. 16, the tool 301 is moved downwardly along a vertical axis onto the duplex connector 201 so that the engagement surface 303 contacts the top of the duplex connector 201. At this point, the long protrusion 313 has passed between the first and second strain relief boots 231 and 233 and the short projections 319 has registered between the first and second strain relief boots 231 and 233.

At this time, the technician presses downwardly with his finger tip on the ridges 323. As best seen in the cross sectional view of FIG. 17, the first edge 307 engages and moves the first latch 205 downwardly to disengage it from the first receptacle of the first adapter half 250. Likewise, the second edge 309 engages and moves the second latch 209 downwardly to disengage it from the second receptacle of the first adapter half 250. As this occurs, the nose 109 of the blocking member 101 is received into the void area 311 of the front face 305 of the tool 301. The technician is then free to pull rearwardly on the tool 301 to remove the duplex connector 201 from the first adapter half 250. To assist in the removal, the rear of the front face 305 may abut the forward edge of the trigger 213, as the tool 301 is moved rightward in FIG. 17.

FIGS. 18-21 illustrate an optional keying arrangement in accordance with the present invention. If it is desired to establish sets of duplex connectors having different levels of security, then the keying arrangement is particularly useful. For example, certain duplex connectors could be designated as level one connectors and other duplex connectors could be designated as level two connectors, with both classes of duplex connectors being blocked and treated as elevated relative to typical, unblocked duplex connectors.

Figure 18:
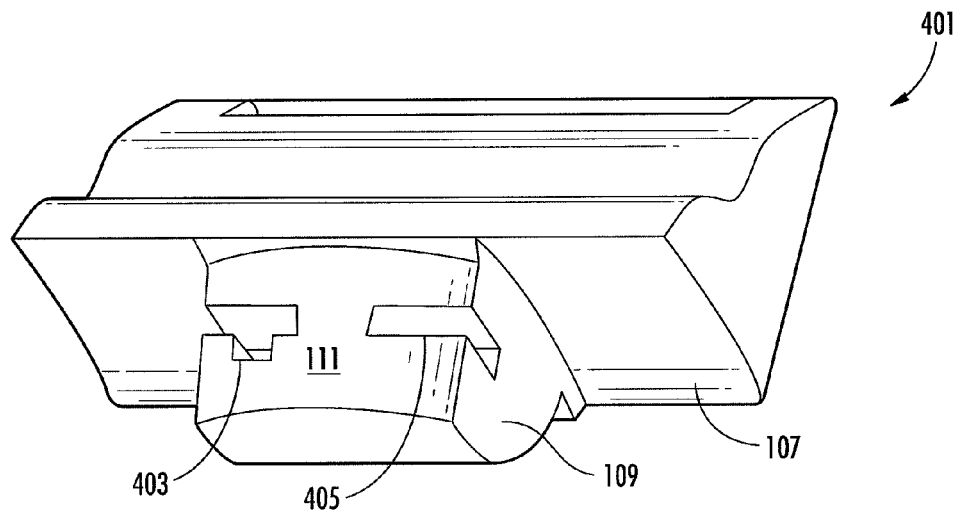
FIG. 18 is a front perspective view of a blocking member, having a first keying sequence.
Figure 19:
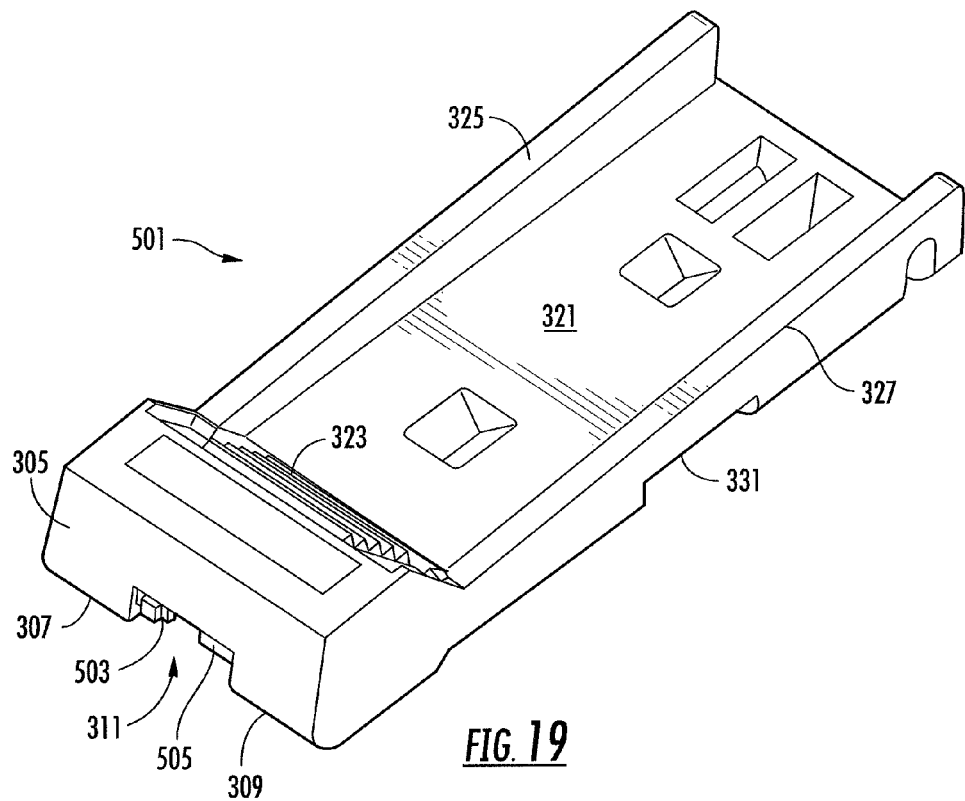
FIG. 19 is a front perspective view of a tool having a complimentary, first keying sequence.

FIGS. 18 and 19 illustrate one embodiment of a level one blocking member 401 and a level one unlatching tool 501. The level one blocking member 401 could be colored red and the level one unlatching tool 501, as shown in FIG. 19, could also be colored red.

The level one blocking member 401 is constructed identically to the blocking member 101 of FIGS. 4-5, except that the nose 109 includes first and second key shaped slots 403 and 405. The level one unlatching tool 501 is constructed identically to the unlatching tool 301 of FIGS. 11-14, except that part of the void area 311 of the forward face 305 is occupied by first and second key edges 503 and 505, complimentary in shape to the first and second key slots 403 and 405.

Figure 20:
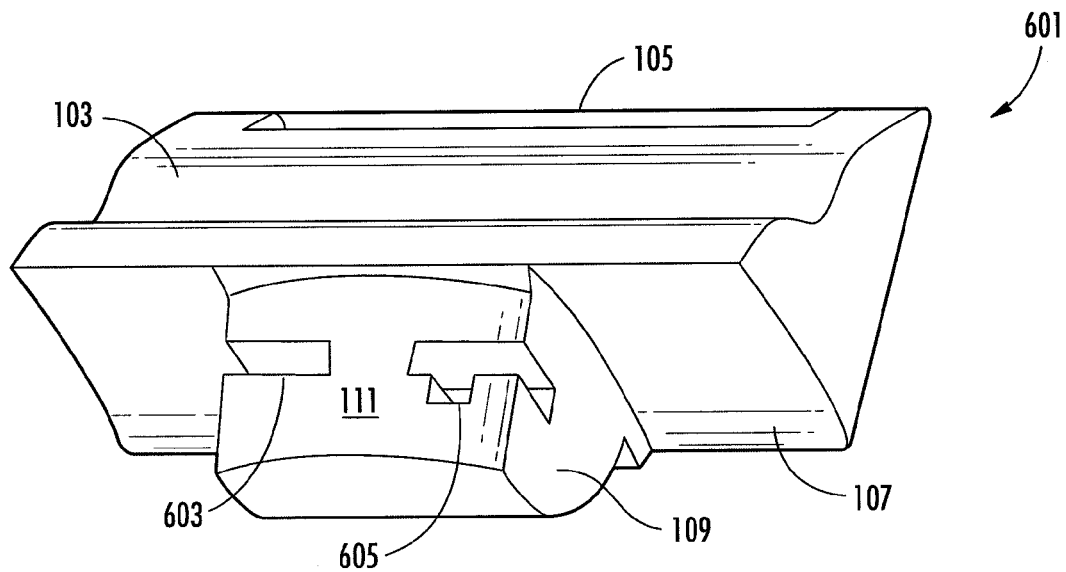
FIG. 20 is a front perspective view of a blocking member, having a second keying sequence.
Figure 21:
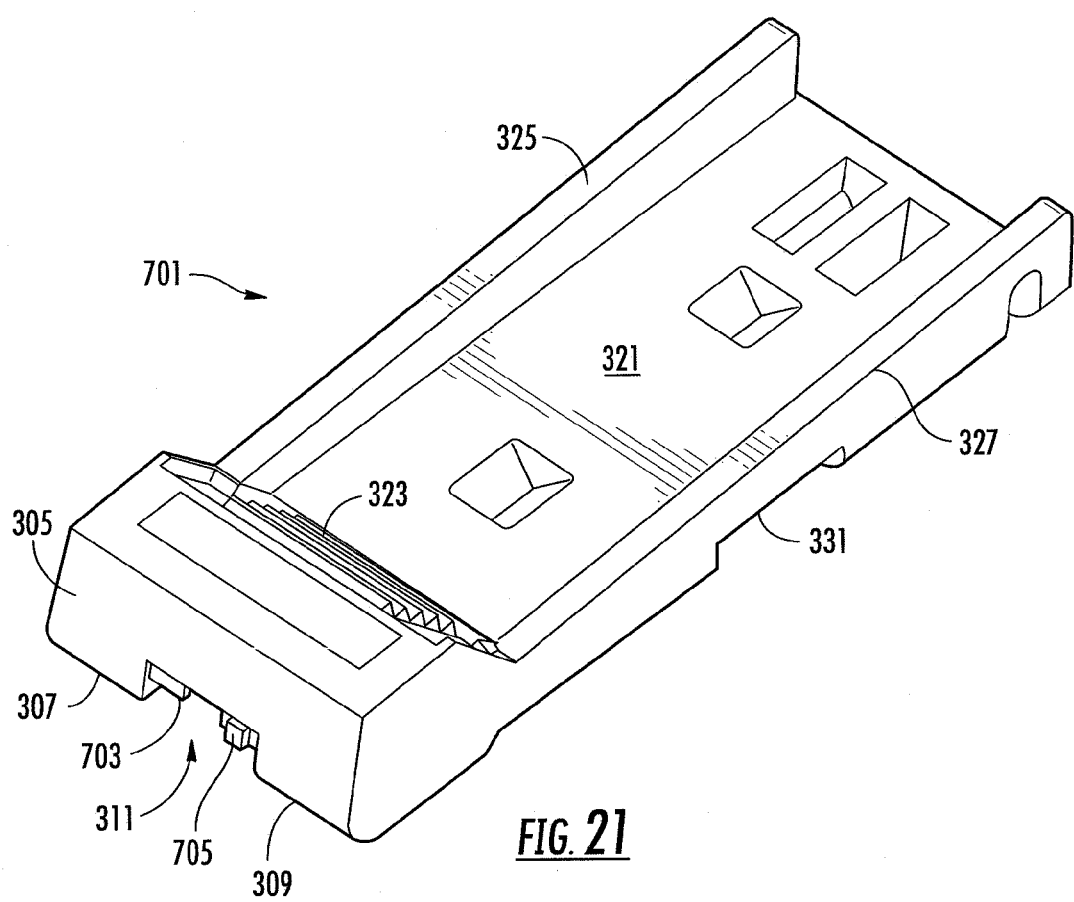
FIG. 21 is a front perspective view of a tool having a complimentary, second keying sequence.

FIGS. 20 and 21 illustrate one embodiment of a level two blocking member 601 and a level two unlatching tool 701. The level two blocking member 601 could be colored yellow and the level two unlatching tool 701, as shown in FIG. 21, could also be colored yellow.

The level two blocking member 601 is constructed identically to the blocking member 101 of FIGS. 4-5, except that the nose 109 includes third and fourth shaped slots 603 and 605. The level two unlatching tool 701 is constructed identically to the unlatching tool 301 of FIGS. 11-14, except that part of the void area 311 of the forward face 305 is occupied by third and fourth key edges 703 and 705, complimentary in shape to the third and fourth key slots 603 and 605.

By virtue of the keying system a first set of duplex connectors (e.g., level one) can be blocked from manual unlatching and be unlatched using a first tool (e.g. the level one unlatching tool 501), while a second set of duplex connectors (e.g., level two) can be blocked from manual unlatching and be unlatched using a second tool (e.g., the level two unlatching tool 701), where the second tool 701 will not unlatch the duplex connectors of the first set and the first tool 501 will not unlatch the duplex connectors of the second set.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. For a duplex connector of the type having a first plug with a first depressible latch for engaging and disengaging the first plug into a first receptacle, a second plug with a second depressible latch for engaging and disengaging the second plug into a second receptacle, an attachment feature between the first plug and the second plug, and at least one trigger to depress the first and second latches, an apparatus comprising:
a blocking member sized to be manually inserted beneath the at least one trigger to block movement of the least one trigger toward the first and second latches and hence prevent the at least one trigger from depressing the first and second latches to release the first and second plugs from the first and second receptacles.

2. The apparatus of claim 1, wherein said blocking member includes a nose sized to protrude between the first and second latches when said blocking member is positioned beneath the at least one trigger.

3. The apparatus of claim 2, wherein said nose is sized and shaped to not interfere with depressing of the first or second latches to a position releasing the first and second plugs from the first and second receptacles.

4. The apparatus of claim 2, further comprising:
a tool used to depress the first and second latches, wherein said tool includes a first edge to depress the first latch, a second edge to depress the second latch, and a void area between said first and second edges to receive said nose of said blocking member, when said first and second edges move to depress the first and second latches.

5. The apparatus of claim 2, further comprising:
a tool used to depress the first and second latches, wherein said tool includes a first edge to depress the first latch, a second edge to depress the second latch, and a key shaped edge between said first and second edges, and wherein said nose of said blocking member includes a key slot formed therein to receive said key-shaped edge of said tool, when said first and second edges move to depress the first and second latches.

6. The apparatus of claim 1, wherein the at least one trigger is a single trigger, which engages both the first and second latches, and wherein said blocking member is sized to reside between the single trigger and a body of at least one of the first and second plugs or the attachment feature between the first and second plugs.

7. The apparatus of claim 1, wherein the at least one trigger includes a first trigger for engaging the first latch and a second trigger for engaging the second latch, and wherein said blocking member is sized to reside between the first trigger and a body of the first plug and between the second trigger and a body of the second plug.

8. A duplex connector apparatus comprising:
a first plug with a first depressible latch for engaging and disengaging said first plug into a first receptacle;
a second plug with a second depressible latch for engaging and disengaging said second plug into a second receptacle;
an attachment feature between said first plug and said second plug;
at least one trigger to depress said first and second latches; and
a blocking member sized to be manually inserted beneath said at least one trigger to block movement of said least one trigger toward said first and second latches and hence prevent said at least one trigger from depressing said first and second latches to release said first and second plugs from the first and second receptacles.

9. The apparatus of claim 8, wherein said first and second plugs are first and second fiber optic plugs of the simplex type.

10. The apparatus of claim 8, wherein said blocking member includes a nose sized to protrude between said first and second latches when said blocking member is positioned beneath said at least one trigger.

11. The apparatus of claim 10, further comprising:
a tool used to depress said first and second latches, wherein said tool includes a first edge to depress said first latch, a second edge to depress said second latch, and a void area between said first and second edges to receive said nose of said blocking member, when said first and second edges move to depress said first and second latches.

12. The apparatus of claim 10, further comprising:
a tool used to depress said first and second latches, wherein said tool includes a first edge to depress said first latch, a second edge to depress said second latch, and a key shaped edge between said first and second edges, and wherein said nose of said blocking member includes a key slot formed therein to receive said key-shaped edge of said tool, when said first and second edges move to depress said first and second latches.

13. The apparatus of claim 8, wherein said at least one trigger is a single trigger, which engages both said first and second latches, and wherein said blocking member is sized to reside between said single trigger and a body of at least one of said first and second plugs or said attachment feature between said first and second plugs.

14. The apparatus of claim 8, wherein said at least one trigger includes a first trigger for engaging said first latch and a second trigger for engaging said second latch, and wherein said blocking member is sized to reside between said first trigger and a body of said first plug and between said second trigger and a body of said second plug.

15. The apparatus of claim 10, wherein said nose of said blocking member is sized and positioned to protrude upward between said first and second latches, so as to snap lock said blocking member in place beneath said at least one trigger.

16. A tool apparatus for unlatching a duplex connector from receptacles into which the duplex connector is engaged, said tool comprising:
an engagement surface to rest on top of a duplex connector; and
a forward face for passing over at least one trigger of the duplex connector and engaging an upper surface of latches of the duplex connector to depress the latches.

17. The apparatus of claim 16, wherein said forward face includes a first edge to depress a first latch, a second edge to depress a second latch and a void area between said first and second edges.

18. The apparatus of claim 16, wherein said forward face includes a first edge to depress a first latch, a second edge to depress a second latch and a keyed shaped edge between said first and second edges to be received within a key shaped slot of a blocking device positioned between the first and second latches of the duplex connector.

19. The apparatus of claim 16, further comprising:
a projection beneath said engagement surface to protrude between portions of first and second plugs forming the duplex connector.

20. The apparatus of claim 16, further comprising:
right and left side walls flanking said engagement surface, wherein said right and left sidewalls each include a notch for receiving a loop of material to secure said tool to a user's finger.

* * * * *